(12) United States Patent
Chou

(10) Patent No.: US 10,618,118 B2
(45) Date of Patent: Apr. 14, 2020

(54) CHUCK WITH AUTOMATIC POSITIONING COLLET

(71) Applicant: Go-Team Co., LTD., Taichung (TW)

(72) Inventor: Li Fu Chou, Taichung (TW)

(73) Assignee: Go-Team Co., LTD., Taichung (TW)

( * ) Notice: Subject to any disclaimer, the term of this patent is extended or adjusted under 35 U.S.C. 154(b) by 0 days.

(21) Appl. No.: 16/208,595

(22) Filed: Dec. 4, 2018

(65) Prior Publication Data

US 2019/0240742 A1    Aug. 8, 2019

(30) Foreign Application Priority Data

Feb. 3, 2018  (TW) .............................. 107105190 A

(51) Int. Cl.
*B23B 31/20*   (2006.01)
*B23B 31/175*  (2006.01)

(52) U.S. Cl.
CPC .......... *B23B 31/1622* (2013.01); *B23B 31/20* (2013.01); *B23B 31/205* (2013.01); *B23B 2231/2089* (2013.01); *B23B 2270/027* (2013.01)

(58) Field of Classification Search
CPC .............. B23B 31/1622; B23B 31/20; B23B 2231/2089; B23B 2270/027; B23B 31/205; B23B 31/204; B23B 2231/2083
See application file for complete search history.

(56) References Cited

U.S. PATENT DOCUMENTS

| 1,320,113 | A | * | 10/1919 | Bemis | ..................... | B23B 31/20 279/49 |
| 2,383,094 | A | * | 8/1945 | Walder | .................. | B23B 31/204 279/4.08 |
| 2,461,292 | A | * | 2/1949 | Mead | ..................... | B23Q 3/068 279/4.08 |
| 2,562,134 | A | * | 7/1951 | Smitka | .................. | B23B 31/204 279/4.08 |
| 2,620,196 | A | * | 12/1952 | Church | ................. | B23B 31/204 279/4.04 |
| 2,889,150 | A | * | 6/1959 | Goldring | ................ | B23Q 3/068 279/4.09 |
| 3,087,736 | A | * | 4/1963 | Lukas | .................... | B23Q 3/068 279/4.08 |
| 4,682,920 | A | * | 7/1987 | Rodgers | ................ | B23B 31/205 279/4.08 |

(Continued)

*Primary Examiner* — Sunil K Singh
*Assistant Examiner* — Paul M Janeski
(74) *Attorney, Agent, or Firm* — Andrew C. Cheng

(57) ABSTRACT

A chuck with automatic positioning collet is provided. The chuck includes a rotation member, over which a stationary member is sleeved. A piston is arranged inside the rotation member by means of a slidable sleeve that includes an internal thread screwed to an external thread of a collet. The rotation member includes an elastic piston pin assembly selectively alignable with a positioning groove of the collet. The stationary member is provided with two gas passages through which gas introduced may drive the piston to move in opposite directions so as to move the slidable sleeve and the collet in opposite directions to cause a tapering hole of the rotation member to loop tightly up or release the collet and an object received in the collet and the gas simultaneously drives the elastic piston pin assembly to position the positioning groove of the collet.

2 Claims, 6 Drawing Sheets

(56) References Cited

U.S. PATENT DOCUMENTS

| | | | | |
|---|---|---|---|---|
| 4,791,841 A * | 12/1988 | Pruvot | ............... | B23B 31/205 |
| | | | | 279/4.08 |
| 4,943,071 A * | 7/1990 | Srebot | ................. | B23B 31/16 |
| | | | | 279/110 |
| 5,249,815 A * | 10/1993 | Beere | ................. | B23Q 3/068 |
| | | | | 279/4.04 |
| 7,971,883 B2 * | 7/2011 | Soroka | ............. | B23Q 1/0072 |
| | | | | 279/155 |
| 2002/0053771 A1 * | 5/2002 | Wu | ................... | B23B 31/204 |
| | | | | 279/4.07 |
| 2008/0282878 A1 * | 11/2008 | Chai | ................ | B23B 31/204 |
| | | | | 92/2 |
| 2011/0180982 A1 * | 7/2011 | Baumann | ........... | B23B 31/207 |
| | | | | 269/20 |
| 2013/0147131 A1 * | 6/2013 | Mitchell | ............ | B23B 31/205 |
| | | | | 279/4.09 |
| 2015/0014947 A1 * | 1/2015 | McCluskey | ........ | B23B 31/207 |
| | | | | 279/43.6 |

\* cited by examiner

CHUCK WITH AUTOMATIC POSITIONING COLLET

BACKGROUND OF THE INVENTION

1. Field of the Invention

The present invention relates to the field of chucks of machine tools, and more particularly to a chuck with automatic positioning collet, which includes a first gas passage into which gas is introduced to drive a piston, a slidable sleeve, and a collect to advance and also to drive an elastic piston pin assembly to advance at the same time, and a second gas passage into which gas is introduced to drive the piston, the slidable sleeve, and the collect to retract and also to drive the elastic piston pin assembly to retract at the same time to thereby achieve automatic positioning of the collet.

2. The Related Arts

Referring to FIG. 1, a cross-sectional view of a portion of a known chuck is shown. The known chuck 10 is coupled with a collet 11. The known chuck 10 comprises a first gas passage connector 12 and a second gas passage connector 13. The known chuck 10 is made up of a stationary member 14 and a rotation member 15. The collet 11 has a fixed and identical configuration that is provided with elastically-deformable slits, an external thread, and a positioning groove.

The known chuck 10 uses an insertion pin 16 to position the collet 11. The insertion pin 16 is provided with an inclined surface 161. A screw 17 is mounted to the chuck 10, such that a front end of the screw 17 abuts the inclined surface 161. By manually rotating and fastening the screw 17 to push against the inclined surface 161 of the insertion pin 16, positioning of the collet 11 is achieved. Other known devices use two nuts that are manually operated to lock with each other so as to achieve positioning of the collet.

In view of the above-discussed problems of the existing structures, it is desired to provide a novel structure that is more practical for use and this is a goal of development and research of those involved in this business.

The present invention aims to provide a solution that overcomes the above problems.

SUMMARY OF THE INVENTION

The primary objective of the present invention is to provide a chuck with automatic positioning collet, in which ingress gas introduced through a first gas passage makes a piston, a slidable sleeve, and a collet advancing and simultaneously makes an elastic piston pin assembly advancing and ingress gas introduced through a second gas passage makes the piston, the slidable sleeve, and the collet retracting and simultaneously make the elastic piston pin assembly retracting to thereby achieve an effect of automatic positioning of the collet.

To achieve the above objective, the present invention provides a chuck with automatic positioning collet, which comprises: a rotation member, which has an outer circumference over which a stationary member is sleeved. The outer circumference has a front end to which a surface plate is mounted to extend in a direction toward the rotation member to constrain the stationary member. Bearings are provided between and separate the rotation member and the stationary member from each other. The rotation member has a rear end that is formed with a gas chamber. A bottom and a nut are provided at a rear side of the gas chamber. A slidable sleeve is arranged inside the rotation member and screwed to the piston. The piston is arranged in the gas chamber. The rotation member is formed with a through hole, which has a front end formed as a tapering hole. The slidable sleeve is formed with an internal thread and comprises at least one elastic piston pin assembly, which, when pressed, penetrates out and reach into the through hole. A first gas passage connector is arranged to provide communication, through the stationary member, with a front side of the piston and the elastic piston pin assembly by way of a first gas passage. A second gas passage connector is arranged to provide communication, through the stationary member, with a rear side of the piston by way of the second gas passage. A collet is formed with three elastically-deformable slits and has a conic head, an external thread, and a positioning groove. An object is receivable in the collet and the collet is receivable in the through hole to have the external thread thereof screwed to the internal thread of the slidable sleeve and the positioning groove in alignment with one of the at least one elastic piston pin assembly. Gas introduced into the first gas passage connector drives the piston, so as to cause the slidable sleeve and the collet to move rearward and the tapering hole loops up the collet and the object tightly and the gas simultaneously drives the elastic piston pin assembly to position the positioning groove of the collet to achieve an effect of the elastic piston pin assembly being advanced at the same time when the piston is advanced. Gas introduced into the second gas passage connector drives the piston so as to cause the slidable sleeve and the collet to move frontward and the tapering hole releases the collet and the object. A spring of the elastic piston pin assembly returns the elastic piston pin assembly to the original position to thereby releasing positioning, so as to achieve an effect of the elastic piston pin assembly being retracted at the same time when the piston is retracted. As such, automatic positioning of the collect is realized.

BRIEF DESCRIPTION OF THE DRAWINGS

The present invention can be fully understood from the following detailed description and preferred embodiments with reference to the accompanying drawings, in which.

DETAILED DESCRIPTION OF THE PREFERRED EMBODIMENTS

The present invention provides a chuck with automatic positioning collet.

For better understanding of the purposes, features, and effectiveness of the present invention, an embodiment will be described with reference to the drawings.

Figure 1:
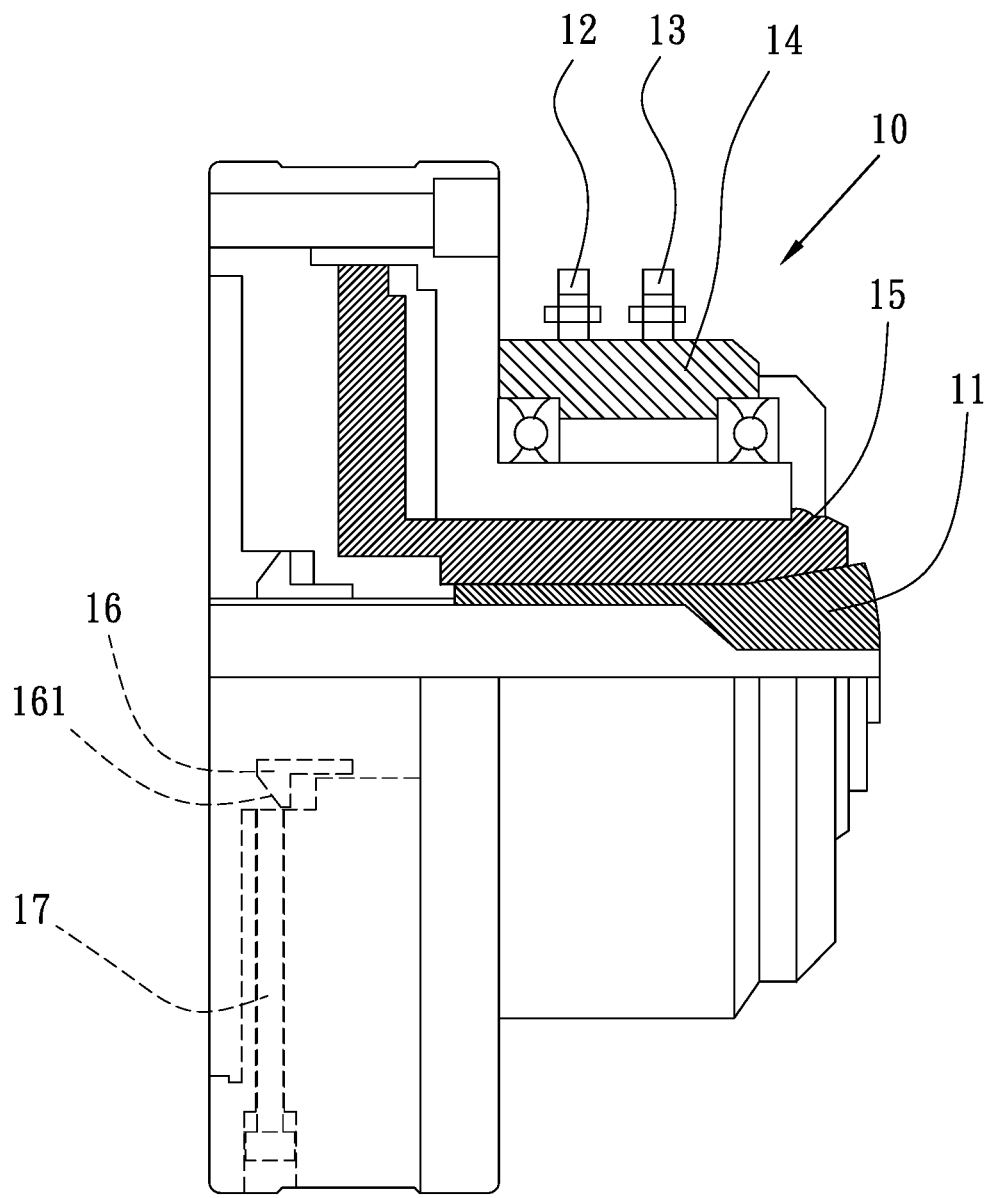
FIG. 1 is a cross-sectional view of a portion of a known chuck.
Figure 2:
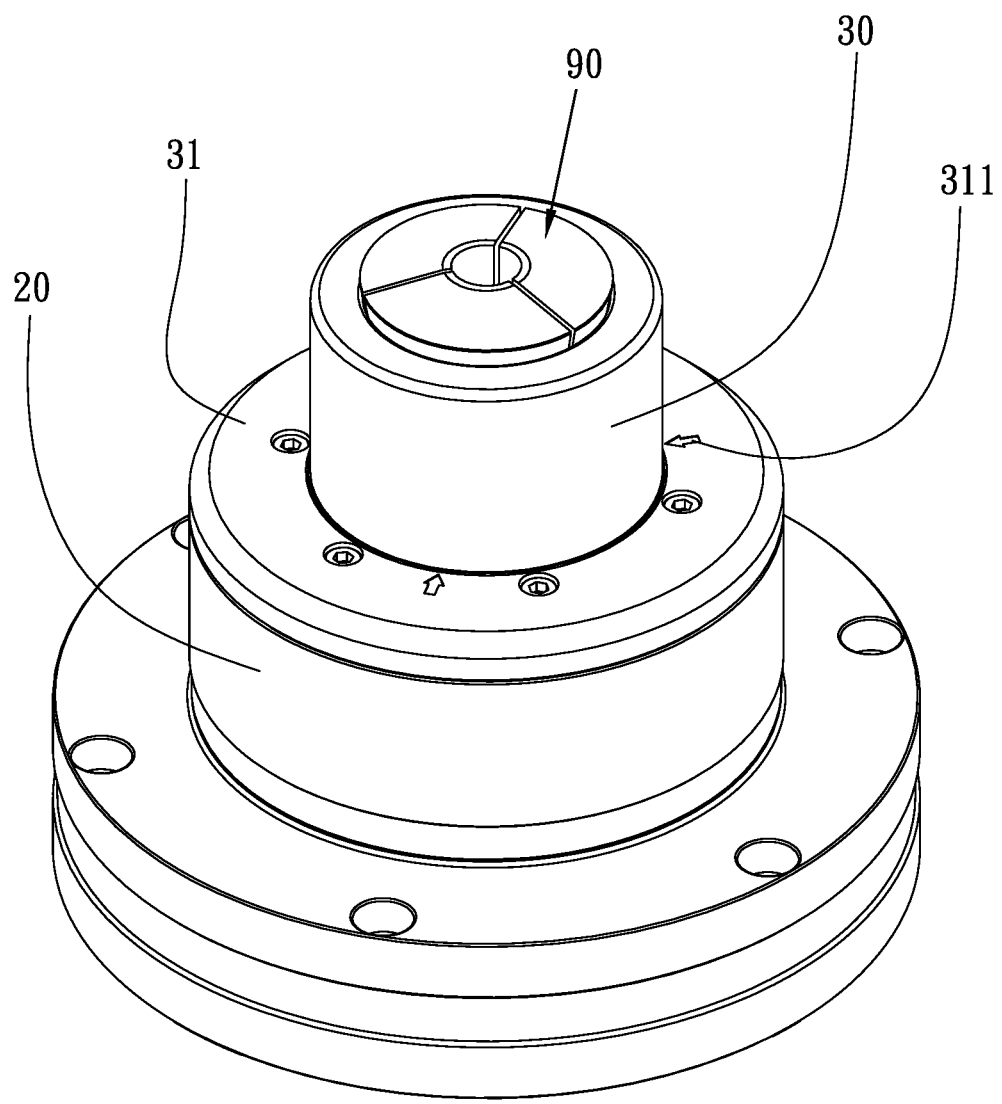
FIG. 2 is a perspective view showing an embodiment of the present invention.
Figure 3:
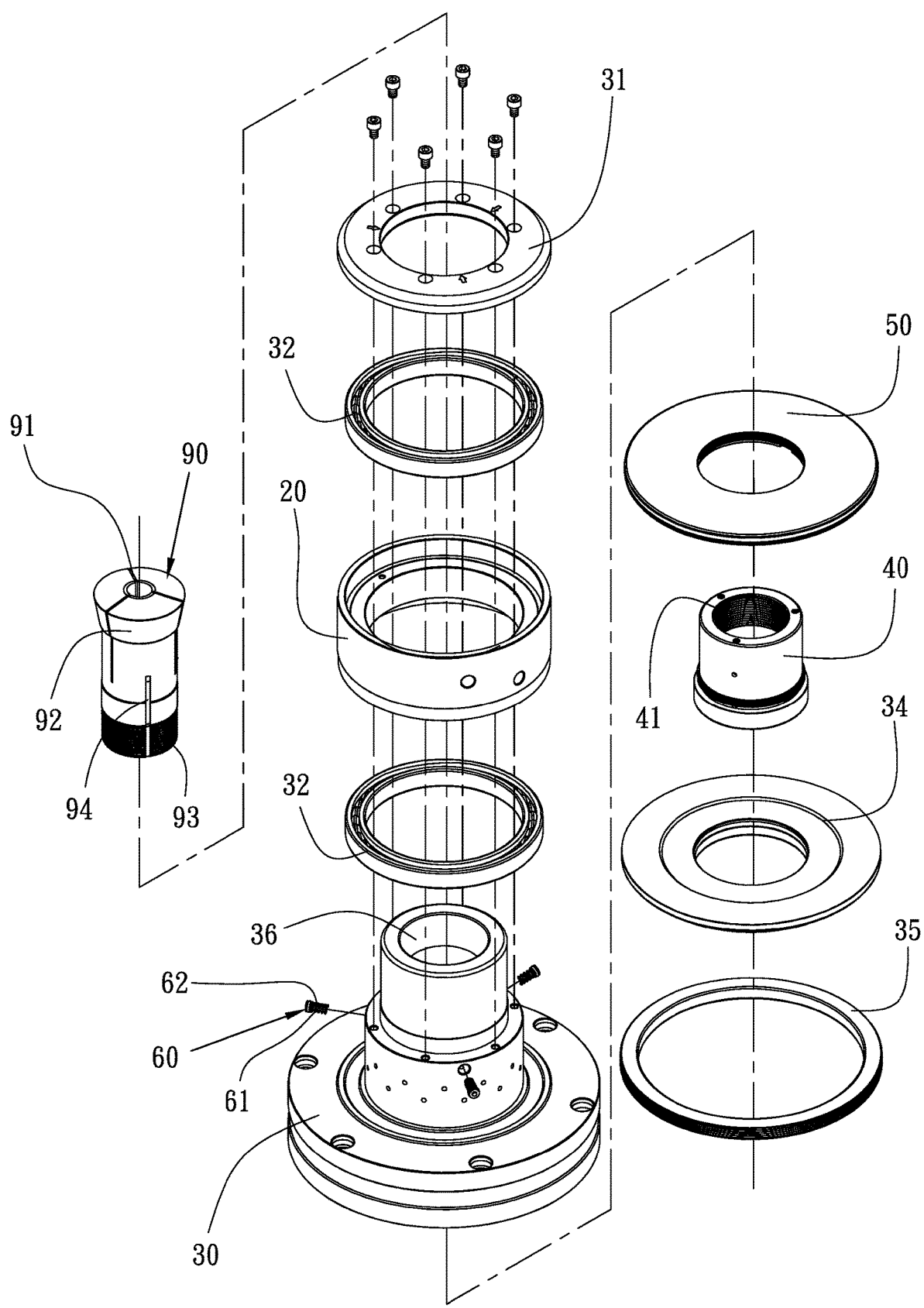
FIG. 3 is an exploded view showing the embodiment of the present invention.

Referring to FIGS. 2-3, the present invention provides a chuck with automatic positioning collet, which comprises the following components/parts:

a stationary member 20, which is a component that is fixed in position; a rotation member 30, which is rotatable at a predetermined speed, wherein the rotation member 30 has an outer circumference over which the stationary member 20 is fit and rotatably coupled, the outer circumference having a front end to which a surface plate 31 is mounted to extend toward the rotation member 30 so as to constrain the stationary member 20, the rotation member 30 and the stationary member 20 being separated from each other by a plurality of bearings 32 arranged therebetween, the rotation member 30 having a rear end that is formed with a gas chamber 33 having a rear side to which a bottom lid 34 and a nut 35 are fixed; a slidable sleeve 40, which is arranged such that the slidable sleeve 40 is located internally of the rotation member 30, the slidable sleeve 40 being provided with an internal thread 41; a piston 50, which is arranged such that the piston 50 is located internally of the rotation member 30, the slidable sleeve 40 being screwed to and in threading engagement with the piston 50, the piston 50 being located inside the gas chamber 33, the rotation member 30 being formed with a through hole 36 extending therethrough completely, the through hole 36 having a front end portion that is formed as a tapering hole 361.

Figure 4:
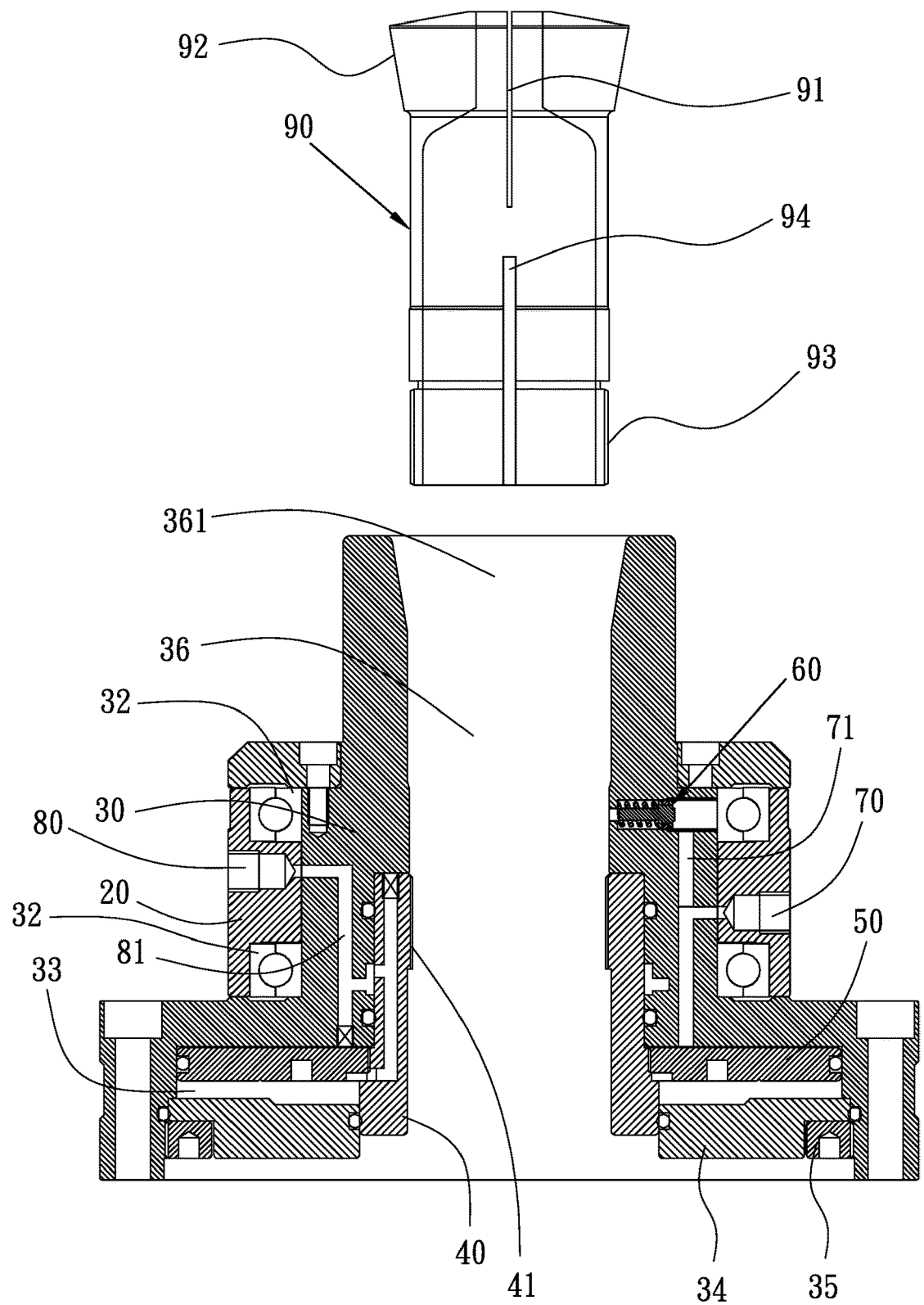
FIG. 4 is a cross-sectional view showing the embodiment of the present invention.
Figure 5:
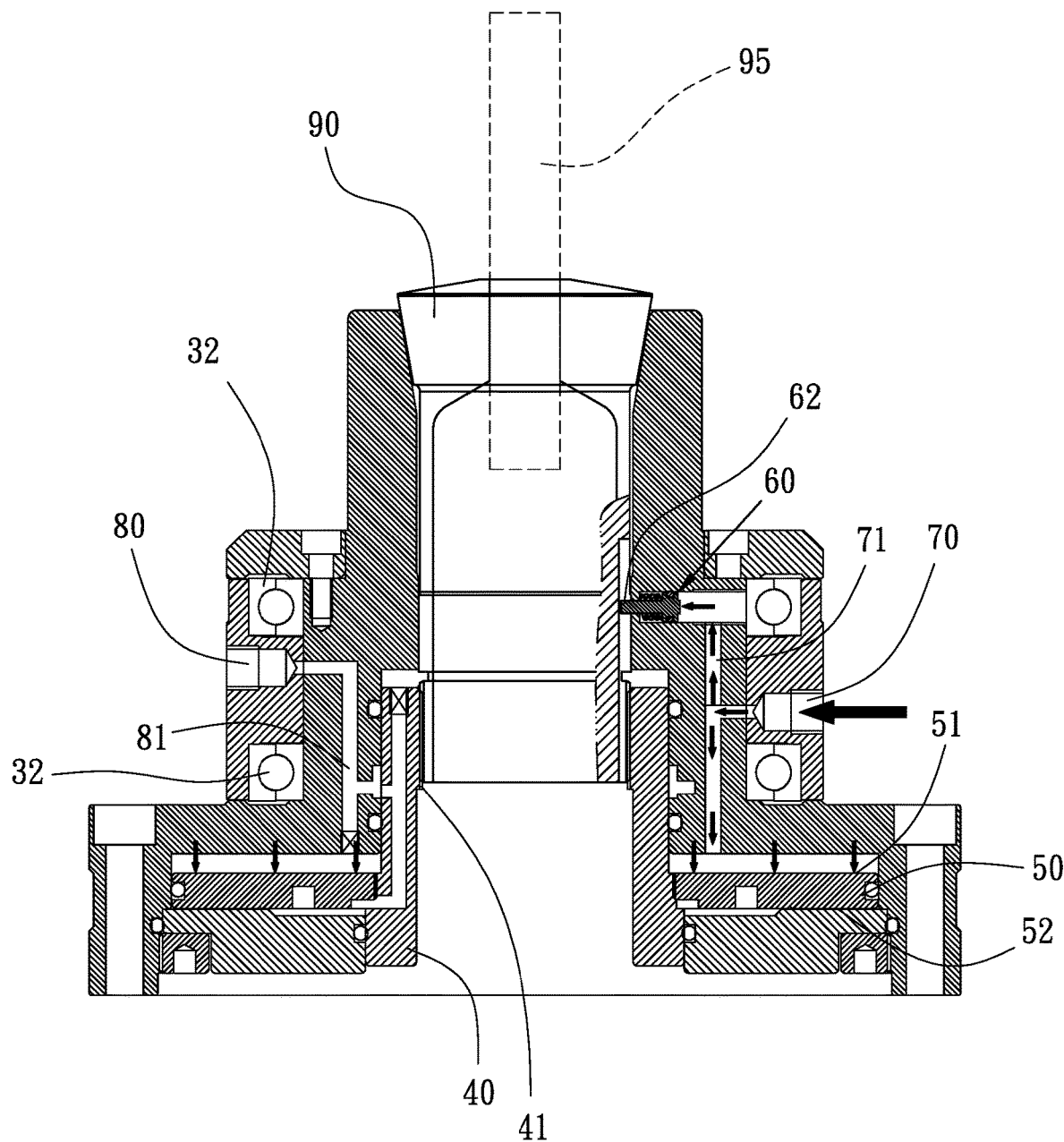
FIG. 5 is a cross-sectional view showing an operation of the embodiment of the present invention, in which gas is introduced through a first gas passage.
Figure 6:
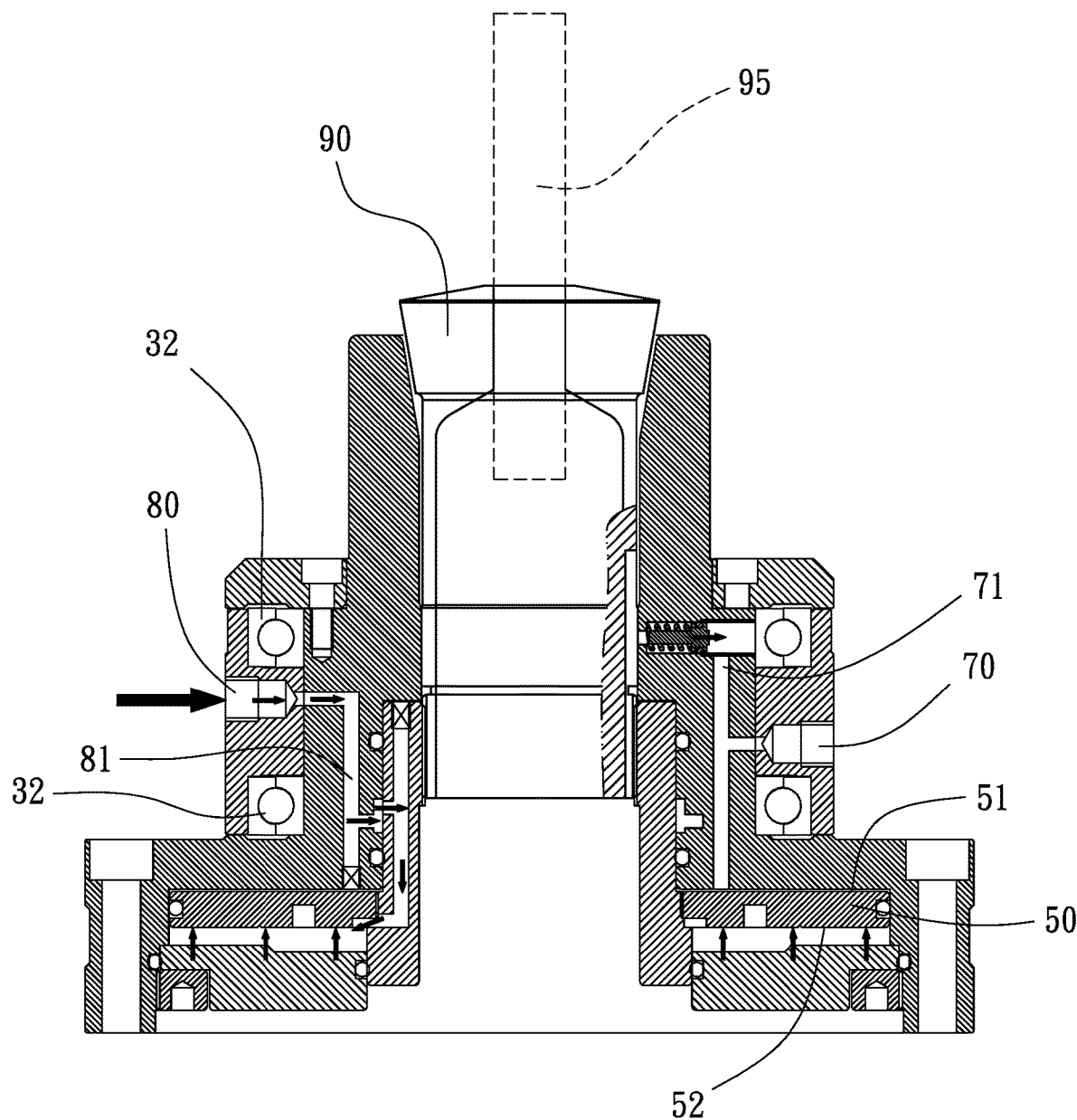
FIG. 6 is a cross-sectional view showing an operation of the embodiment of the present invention, in which gas is introduced through a second gas passage.

Referring to FIGS. 4-6, the present invention provides a chuck with automatic positioning collet, which generally comprises: at least one elastic piston pin assembly 60, wherein the elastic piston pin assembly 60 is arranged in and assembled with the rotation member 30 to have an insertion pin 62 extending toward the through hole 36, such that when the elastic piston pin assembly 60 is pressed or pushed, the insertion pin 62 penetrates into the through hole 36, a first gas passage connector 70 being arranged to provide communication through the stationary member 20 with a front side of a piston 50 at one end of a first gas passage 71 and the elastic piston pin assembly 60 at an opposite end of the first gas passage 71; a second gas passage connector 80 being arranged to provide communication through the stationary member 20 with a rear side 52 of the piston 50 by way of the second gas passage 81; a collet 90, which is provided with a plurality of elastically-deformable slits 91, a conic head 92, an external thread 93, and a positioning groove 94, wherein an object 95 is receivable into the collet 90, and the collet 90 is received into the through hole 36, such that the external thread 93 of the collet 90 is set in threading engagement with the internal thread 41 of the slidable sleeve 40 and the positioning groove 94 of the collet 90 is in alignment with one of the elastic piston pin assemblies 60; wherein gas introduced, as ingress gas, into the first gas passage connector 70 drives movement of the piston 50, such that the slidable sleeve 40 and the collet 90 are caused to move rearward and the tapering hole 361 tightly loop up and fix the collet 90 and the object 95 and the elastic piston pin assembly 60 is caused by the ingress gas to position the positioning grooves 94 of the collet 90, wherein the elastic piston pin assembly 60 is pushed to move for activation in synchronization with the piston 50 being pushed and moved for activation; and wherein gas introduced, as ingress gas, into the second gas passage connector 80 drives the piston 50, the slidable sleeve 40, and the collet 90 to move frontward such that the collet 90 and the object 95 are released from the tapering hole 361 and a spring 61 of the elastic piston pin assembly 60 returns the elastic piston pin assembly 60 back to a home position to release the fixing thereof, wherein the piston 50 is moved backward for deactivation in synchronization with the elastic piston pin assembly 60 being moved backward for deactivation. As such, automatic positioning of the collet 90 may be achieved.

In the chuck with automatic positioning collet according to the present invention, a number of elastic piston pin assemblies 60 are provided and the number is determined according to a pitch of the external thread 93 of the collet 90, wherein for a pitch that is not greater than 1.5 mm, it is preferred to use 3 to 4 elastic piston pin assemblies 60; for a pitch that is between 1.5 mm and 2 mm, it is preferred to use 4 to 5 elastic piston pin assemblies 60; and for a pitch that is greater than 2 mm, it is preferred to use 5 to 6 elastic piston pin assemblies 60. Preferably, a surface of the surface plate 31 is provided with arrow marks 311 of the same number of the elastic piston pin assemblies 60 to respectively align with and correspond, in position, to the elastic piston pin assemblies 60.

The present invention provides a chuck with automatic positioning collet, wherein the chuck of the present invention is applicable to various machine tools or processing machines. The chuck of the present invention is operable to fix the collet 90 and the object 95 and to set the collet 90 in a proper position to prevent the collet 90 from rotating with the chuck during the rotation of the chuck. The operations of fixing and positioning are both automatically controlled through pneumatic measures. The known chucks use an insertion pin to position a collet 90 through manual rotation and tightening a screw or through manual tightening two nuts for locking. Such a conventional arrangement cannot be made automatized to suit the need of modern lighting-off workshops or automatic workshops. The present invention provides a solution to overcome such a problem.

It can be seen from the above description that the chuck with automatic positioning collet according to the present invention is a novel design that has been long desired, wherein the introduction of gas into the first gas passage can activate a piston, a slidable sleeve, and a collet for frontward movement and also simultaneously activate an elastic piston pin assembly to move forward, while introduction of gas into the second gas passage deactivate and retract the piston, the slidable sleeve, and the collet backward and simultaneously deactivate the elastic piston pin assembly to achieve an effect of automatic positioning of the collet.

Illustrated above is an embodiment of the present disclosure, which should not be considered limitative to the scope of the invention. Therefore, any equivalent substitutions or variations to the structures or processes disclosed in the specification and the drawing of the present disclosure, or a direct or indirect application of the invention to the other technical fields should be considered as part of the present disclosure.

What is claimed is:

1. A chuck, comprising:
a stationary member, which is a component that is fixed in position; a rotation member, which is rotatable at a predetermined speed, the rotation member having an outer circumferential surface to which the stationary member is rotatably coupled to, the outer circumferential surface having a front end, a surface plate being mounted to the rotation member at a location corresponding to the front end of the outer circumferential surface and extending circumferentially around the rotation member so as to constrain the stationary member, a plurality of bearings being arranged between and separating the rotation member and the stationary member from each other, the rotation member having a rear end formed with a gas chamber, the gas chamber having a rear side to which a bottom lid and a nut are fixed; a slidable sleeve arranged so that the slidable sleeve is located internally of the rotation member, the slidable sleeve being provided with an internal thread; a piston arranged so that the piston is located internally of the rotation member, the slidable sleeve being screwed to and in threading engagement with the piston, the piston being located inside the gas chamber, the rotation member being formed with a through hole extending therethrough, the through hole having a front end portion formed as a tapering hole;

wherein at least one elastic piston pin assembly is arranged such that the elastic piston pin assembly is mounted in and assembled with the rotation member to have an insertion pin extending toward the through hole, such that when the elastic piston pin assembly is pressed, the insertion pin penetrates into the through hole, a first gas passage connector being arranged to provide communication through the stationary member with a front side of a piston at one end of a first gas passage and the elastic piston pin assembly at an opposite end of the first gas passage; a second gas passage connector being arranged to provide communication through the stationary member with a rear side of piston by way of the second gas passage; a collet formed with a plurality of elastically-deformable slits and having a conic head, an external thread, and a positioning groove; wherein the collet is adapted to receive an object therein and the collet is receivable into the through hole to have the external thread of the collet screwed onto and in threading engagement with the internal thread of the slidable sleeve and the positioning groove of the collet in alignment with one of the at least one elastic piston pin assembly, wherein ingress gas introduced into the first gas passage connector drives the piston to move so that the slidable sleeve and the collet move rearward and the tapering hole clamps the collet tightly and the collet in turn claims the object and the ingress gas simultaneously drives the elastic piston pin assembly to position the positioning groove of the collet, wherein the elastic position pin assembly advances at the same time when the piston advances; ingress gas introduced into the second gas passage connector drives the piston, so that the slidable sleeve and the collet move frontward and the collet and the object are released from the tapering hole, a spring of the elastic piston pin assembly returning the elastic piston pin assembly to release the positioning thereof so that the elastic piston pin assembly retracts at the same time when the piston retracts.

2. The chuck as claimed in claim 1, wherein the at least one elastic piston pin assembly comprises a number of elastic piston pin assemblies, of which the number is determined according to a pitch of the external thread of the collet, wherein for the pitch being not greater than 1.5 mm, the number is 3 to 4; for the pitch being between 1.5 to 2 mm, the number is 4 to 5; and for the pitch being greater than 2 mm, the number is 5 to 6, the surface plate having a surface that is provided with arrow marks of the same number of the elastic piston pin assemblies to respectively align with and correspond, in position, to the elastic piston pin assemblies.

* * * * *